US009654197B2

(12) United States Patent
Xia et al.

(10) Patent No.: US 9,654,197 B2
(45) Date of Patent: May 16, 2017

(54) SYSTEM AND METHOD FOR FEEDING BACK CHANNEL INFORMATION

(75) Inventors: Pengfei Xia, San Diego, CA (US); Qiang Wu, Beijing (CN); David Mazzarese, Beijing (CN); Yongxing Zhou, Beijing (CN); Yang Tang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 704 days.

(21) Appl. No.: 13/086,060

(22) Filed: Apr. 13, 2011

(65) Prior Publication Data

US 2011/0255613 A1    Oct. 20, 2011

Related U.S. Application Data

(60) Provisional application No. 61/324,392, filed on Apr. 15, 2010.

(51) Int. Cl.
*H04B 7/06*        (2006.01)

(52) U.S. Cl.
CPC ............. *H04B 7/063* (2013.01); *H04B 7/065* (2013.01); *H04B 7/0634* (2013.01)

(58) Field of Classification Search
USPC ......................... 375/267, 260, 299, 347, 349
See application file for complete search history.

(56) References Cited

U.S. PATENT DOCUMENTS

2009/0154588 A1*  6/2009  Chen et al. ................... 375/267
2009/0245169 A1   10/2009  Zhang et al.
2009/0296850 A1   12/2009  Xu et al.

FOREIGN PATENT DOCUMENTS

CN          101610523 A    12/2009
WO      WO 2009/119988 A1  10/2009
WO      WO 2009/134913 A1  11/2009

OTHER PUBLICATIONS

"Introduction of Rel-10 LTE-Advanced features in 36.213," 3GPP TSG-RAN Meeting #63, R1-106557, Nov. 15-19, 2010, 95 pages, Jacksonville, USA.
"3rd Generation Partnership Project; Technical Specification Group Radio Access Network; Evolved Universal Terrestrial Radio Access (E-UTRA); Physical layer procedures (Release 9)," 3GPP TS 36.213, V9.1.0, Mar. 2010, 79 pages.
"3rd Generation Partnership Project; Technical Specification Group Radio Access Network; Evolved Universal Terrestrial Radio Access (E-UTRA); Multiplexing and channel coding (Release 9)," 3GPP TS 36.212, V9.0.0, Dec. 2009, 61 pages.
International Search Report, Applicant: Huawei Technologies Co., LTD., International Application No. PCT/CN2011/073895, Aug. 18, 2011, 10 pages.

* cited by examiner

*Primary Examiner* — Kabir A Timory
(74) *Attorney, Agent, or Firm* — Slater Matsil, LLP

(57) ABSTRACT

A system and method for feeding back channel information are provided. A method for communications device operations includes generating feedback information, encoding the feedback information to produce a feedback payload, and transmitting the feedback payload to a communications server serving a communications device. The feedback information includes at least a first long term wideband channel statistics and a second long term wideband channel statistics.

19 Claims, 7 Drawing Sheets

SYSTEM AND METHOD FOR FEEDING BACK CHANNEL INFORMATION

This application claims the benefit of U.S. Provisional Application No. 61/324,392, filed on Apr. 15, 2010, entitled "Format of Feeding Back Long Term Channel Information," which application is hereby incorporated herein by reference.

TECHNICAL FIELD

The present invention relates generally to digital communications, and more particularly to a system and method for feeding back channel information.

BACKGROUND

Generally, in a wireless communications system, the communications system's capacity may be significantly improved when a transmitter (such as a base station (BS), NodeB, enhanced NodeB (eNB), and so on, in a downlink (DL) channel) has full or partial knowledge of a channel over which it will be transmitting. Information related to the channel may be referred to as channel information. Channel information may be obtained by the transmitter over a reverse feedback channel. A receiver (such as a mobile station (MS), User Equipment (UE), mobile, user, and so forth, in a DL channel) of transmissions made by the transmitter may transmit channel information back to the transmitter over the reverse feedback channel. The receiver may estimate the channel, generate the channel information, and feed the channel information back to the transmitter.

In Third Generation Partnership Project (3GPP) Long Term Evolution (LTE) Release-9 and earlier compliant communications systems, a reverse feedback channel referred to as a physical uplink control channel (PUCCH) is used to allow receivers to transmit (feedback) channel information to the transmitter. As an example, up to 13 information bits (information prior to encoding) may be transmitted in a single PUCCH packet. Actual PUCCH packet payload is 20 coded bits.

In 3GPP LTE Release-9 and earlier compliant communications systems, there may be several types of channel information, including:

1. Rank Indicator (RI)—an indication of a number of spatial layers that can be supported by a communications channel. The RI may be fedback infrequently.
2. Wideband Precoding Matrix Indicator (PMI) and/or Channel Quality Indicator (CQI)—indications of channel quality or a codebook quantized version of the channel quality for a wideband channel. The wideband PMI/CQI may be fedback frequently.
3. Subband CQI—an indication of channel quality for a subband channel. The subband CQI may be fedback frequently.

SUMMARY OF THE INVENTION

These technical advantages are generally achieved, by example embodiments of the present invention which provide a system and method for feeding back channel information.

In accordance with an example embodiment of the present invention, a method for communications device operations is provided. The method includes generating feedback information that includes at least a first long term wideband channel statistics and a second long term wideband channel statistics. The method also includes encoding the feedback information to produce a feedback payload, and transmitting the feedback payload to a communications server serving a communications device.

In accordance with another example embodiment of the present invention, a method for communications controller operations is provided. The method includes receiving a feedback payload from a communications device, and decoding the feedback payload to produce feedback information. The feedback information includes at least a first long term wideband channel statistics and a second long term wideband channel statistics. The method also includes precoding a transmission in accordance with the at least the first long term wideband channel statistics and the second long term wideband channel statistics.

In accordance with another example embodiment of the present invention, a communications device is provided. The communications device includes a channel estimate unit, a feedback information generator coupled to the channel estimate unit, and a transmitter coupled to the feedback information generator. The channel estimate unit is coupled to a receiver, and estimates a communications channel between the communications device and a communications controller serving the communications device, the feedback information generator generates feedback information in accordance with the estimate of the communications channel and encodes the feedback information to produce a feedback payload. The feedback information includes at least a first long term wideband channel statistics and a second long term wideband channel statistics. The transmitter transmits the feedback payload to the communications controller.

One advantage disclosed herein is that additional forms of channel information may be fed back without significantly disrupting the feedback of existing channel information.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE compliant communications system. The invention may also be applied, however, to other communications systems, such as WiMAX, IEEE 802.16 and other communications systems that make use of channel information feedback to improve performance.

Figure 1:
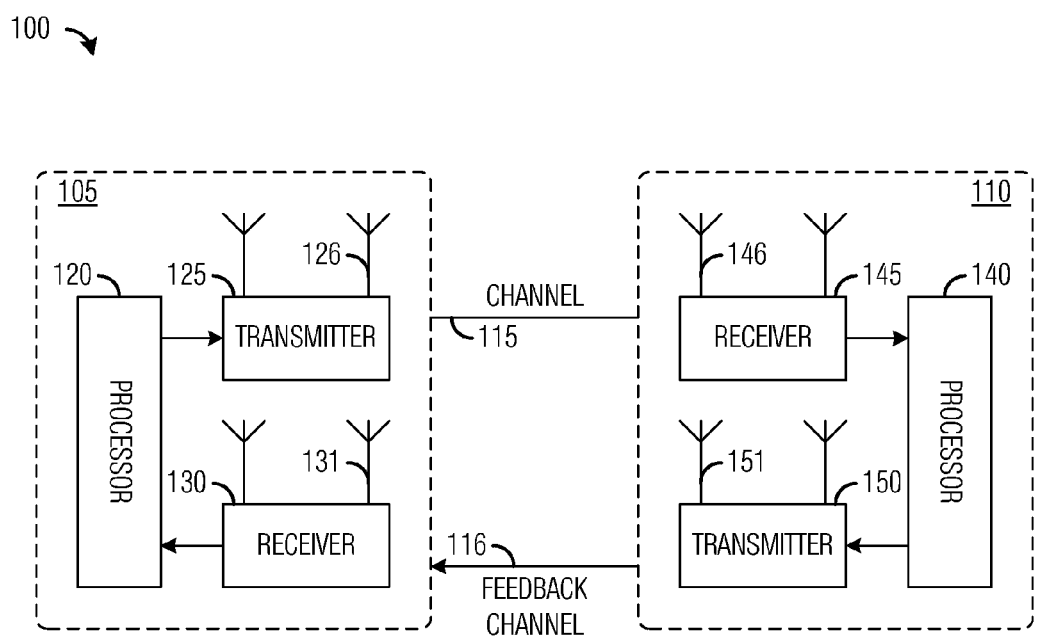
FIG. 1 illustrates an example communications system according to example embodiments described herein.

FIG. 1 illustrates a portion of a communications system 100. Communications system 100 includes a base station (BS) 105 and a mobile station (MS) 110. While it is understood that communications systems may employ multiple base stations capable of communicating with a number of mobile stations, only one BS and one MS are illustrated for simplicity. Each of the aspects of BS and MS operation and structure described below may be provided for each such device. BS 105 communicates with MS 110 over channel 115, and MS 110 feeds back information, including channel information, to BS 105 over feedback channel 116. Channel 115 may include a downlink (DL) channel (from BS 105 to MS 110) and an uplink (UL) channel (from MS 110 to BS 105), while feedback channel 116 may be used by MS 110 to transmit information back to BS 105.

BS 105 includes a processor 120, a transmitter 125 with at least two transmit antennas 126, and a receiver 130 with at least one receive antenna 131. Similarly, MS 110 includes a processor 140, a receiver 145 with at least one receive antenna 146, and a transmitter 150 with at least one transmit antenna 151.

Receiver 145 of MS 110 receives transmissions made by transmitter 125 of BS 105 and from the received transmissions, processor 140 may compute channel information, such as channel mean, spatial domain channel correlation matrix, long and/or short term channel statistics, functions thereof, and so forth. The channel information (in full or partial form) may be transmitted back to BS 105, where it is received by receiver 130 and provided to processor 120 that makes use of the channel information to design future transmissions.

The channel information fed back to BS 105 by MS 110 may be in the form of time domain channel information, frequency domain channel information, or a combination thereof. Time domain channel information may be in the form of short term channel information or long term channel information, while frequency domain channel information may be in the form of sub-band channel information or wideband channel information. In general, long term channel information and/or wideband channel information may be collectively referred to as "long term" and/or "wideband" channel statistics or "long term wideband" channel statistics. Short term channel information may include channel mean, and so on.

Examples of long term channel information include long term wideband channel statistics, a function of the long term wideband channel statistics, a spatial domain channel correlation matrix, eigenvectors of the spatial domain channel correlation matrix, eigenvalues of the spatial domain channel correlation matrix, angle of arrival and/or angle of departure of the channel, and so forth. Examples of wideband channel information include wideband channel characteristics, a function of the wideband channel statistics, a wideband channel correlation matrix, eigenvectors of the wideband channel correlation matrix, eigenvalues of the wideband channel correlation matrix, angle of arrival and/or angle of departure of the channel, and so on.

The discussion provided below focuses mainly on time domain channel information, i.e., short term channel information and/or long term channel information. However, the embodiments presented herein may be operable with either time domain channel information or frequency domain channel information. Therefore, the discussion of time domain channel information should not be construed as being limiting to either the scope or the spirit of the embodiments.

Short term channel information may be useful in designing transmissions at BS 105 due to rapidly changing channel conditions due to factors such as rapid mobility, channel fading, and so forth. Long term channel information may also be useful in designing transmissions, but may be more useful in adapting codebooks, transforming channels, and so on. Although both are useful on their own for designing transmissions, adapting codebooks, transforming channels, and so forth, it may be possible to combine short term channel information and long term channel information at different proportions/frequencies to further enhance communications system performance. For example, since long term channel information may remain substantially constant over short periods of time, long term channel information may not need to be fedback to BS 105 at a high frequency. However, long term channel information may provide a more accurate picture of actual channel behavior over time and may be more useful in adapting and transforming the transmission design since they tend to be immune to transient changes in the channel.

Figure 2A:
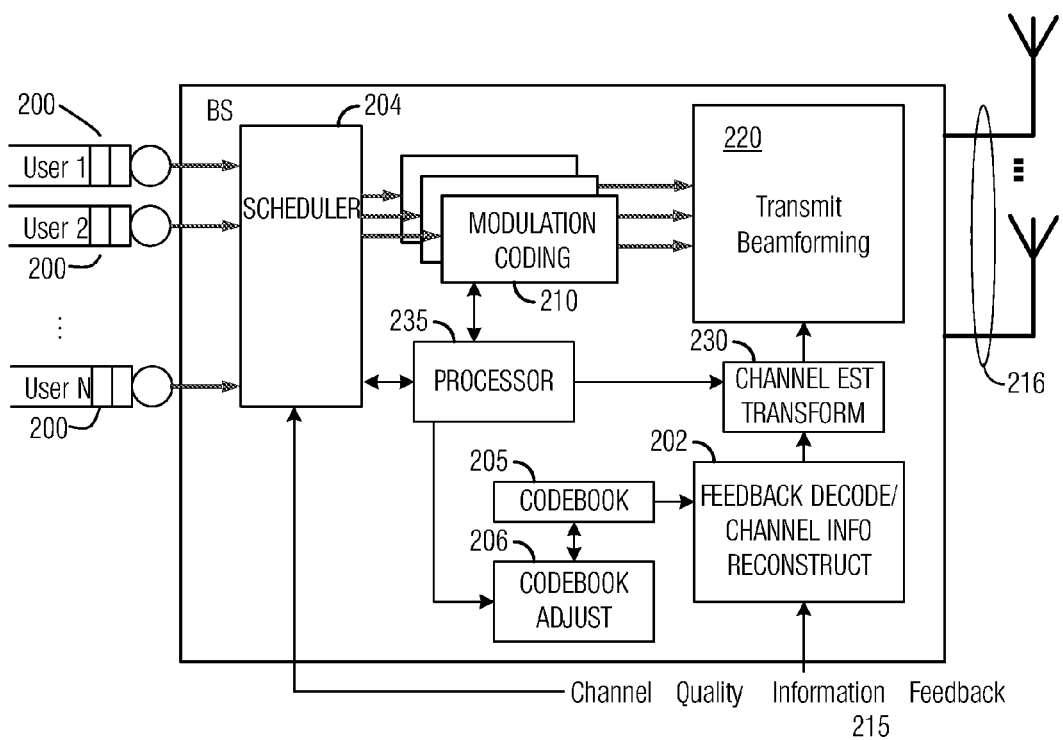
FIG. 2a illustrates an example base station according to example embodiments described herein.

FIG. 2a illustrates a BS 201. Data 200, in the form of bits, symbols, or packets for example, destined for a plurality of MSs being served are sent to a scheduler 204, which decides which MSs will be transmitted to in a given time/frequency opportunity. For example, with MU-MIMO, scheduler 204 may select L out of K MSs for transmission at a given time, where K and L are integer values and L is less than or equal to K. The selection of the L MSs may be in accordance with factors such as maximizing throughput, service history, MS priority, information priority, and so forth. While for SU-MIMO, scheduler 204 may select single MSs for transmission at a given time and/or frequency.

Data for MSs are processed by modulation and coding block 210 to convert to transmitted symbols and add redundancy for the purpose of assisting with error correction or error detection. The modulation and coding scheme is chosen based in part on or in accordance with information about the channel quality information feedback 215.

The output of modulation and coding block 210 is passed to a transmit beamforming block 220, which maps the modulated and coded stream for each MS onto a beamforming vector. The beamformed outputs are coupled to antennas 216 through RF circuitry. The transmit beamforming vectors may be determined by transmit beamforming block 220, which may determine the transmit beamforming vectors in accordance with channel quality information feedback 215 as well as information from scheduler 204, which may include information regarding the MSs selected for transmission, and so on.

Feedback decode/channel information reconstruct unit 202 decodes feedback information from channel quality information feedback 215. Feedback decode/channel information reconstruct unit 202 may be referred to simply as a feedback decoder. Decoding feedback information may involve the use of a codebook 205 if channel quality information feedback 215 was quantized using a codebook by a MS. Codebook 205 may be a baseline codebook as specified by a technical standard, provided by an operator of a communications system that includes BS 201, or so forth. Alternatively, codebook 205 may be an adapted codebook that is originally a baseline codebook or another codebook that has been adapted using long term channel information (in full or partial form) or a function of long term channel information provided by the MS, for example.

The channel information being fedback may have different periodicity. As an example, RI feedback may be fedback at a relatively low frequency, as is long term channel information, while wideband PMI/CQI and/or subband PMI and/or CQI (subband PMI/CQI) may be fedback at a relatively high frequency. Feedback decode/channel information reconstruct unit 202 may need to process the received channel quality information feedback 215 differently in accordance with the type of channel information being fedback.

Adaptation of codebook 205 may be performed by codebook adjust unit 206. Codebook adjust unit 206 may adapt codebook 205 using feedback information provided in channel quality information feedback 215. Codebook adjust unit 206 may also make use of transforms stored in a memory to transform a baseline codebook. Codebook 205 may be implemented as a memory capable of storing a number of different codebooks, such as different baseline codebooks for different channel models, different codebooks for different MSs, different adapted codebooks for different MSs, and so forth.

In addition to including a baseline codebook and an adapted codebook, codebook 205 may also include additional codebooks that may be used to quantize channel information. For example, codebook 205 may include a codebook used to quantize long and/or short term time domain and/or frequency domain channel statistics (although the focus of the discussion is on long and/or short term time domain channel statistics), wideband and/or narrowband frequency domain channel statistics, a transformed channel estimate, wherein a channel estimate is transformed in accordance with a subspace of the channel, such as a long term channel eigenspace, a wideband channel eigenspace, and so forth.

Codebook 205 may also be a joint codebook, with a first portion used to quantize a first set of channel information and a second portion used to quantize a second set of channel information. As an example, a first portion of a codebook may be used to quantize wideband PMI/CQI (referred to herein as W2 for a PMI portion of wideband PMI/CQI) and a second portion of the codebook may be used to quantize long term wideband channel statistics (referred to herein as W1), resulting in a joint codebook W=W1*W2.

It is noted that the long term R can be combined with the short term (wideband) PMI to determine jointly the precoder, with the long term R as one MI (matrix indicator) and wideband PMI as another MI. It is noted that the way the two components are combined to form the suggested precoder may depend on some other factors, e.g., RI.

Additionally, channel quality information feedback 215 may be encoded to protect from transmission errors. The encoding may be jointly or separately performed. If so protected, feedback decode/channel information reconstruct unit 202 may remove the encoding used to protect channel quality information feedback 215 to produce feedback information.

Output of feedback decode/channel information reconstruct unit 202 (e.g., channel state information, long and/or short term channel statistics, channel correlation matrices, and so forth) may be provided to channel estimate transform unit 230. Channel estimate transform unit 230 may be used to transform an estimate of the channel to comply with a transformed channel model used at the MS. For example, channel estimate transform unit 230 may transform the channel estimate into a subspace of the channel, e.g., a long term channel eigenspace or a wideband channel eigenspace, representation of the channel estimate. Additional details on the transformed channel model are provided below. Channel quality information feedback 215 may also be provided to scheduler 204, which may use the information in its scheduling of MSs.

Scheduler 204 may use any of the known scheduling disciplines in the literature including round robin, maximum sum rate, proportional fair, minimum remaining processing time, or maximum weighted sum rate; generally scheduling decisions are in accordance with channel quality information feedback 215 received from the plurality of MSs. Scheduler 204 may decide to send information to a single MS via transmit beamforming (SU-MIMO) or may decide to serve multiple MSs simultaneously through MU-MIMO communications.

Modulation and coding block 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment may be made in accordance with channel quality information feedback 215 in a preferred embodiment and may be determined jointly in scheduler 204.

While not explicitly illustrated, it is obvious to those of ordinary skill in the art that OFDM modulation can be used.

Further, any number of multiple access techniques could be used including orthogonal frequency division multiple access, code division multiple access, frequency division multiple access, or time division multiple access. The multiple access technique may be combined with the modulation and coding block 210 or the transmit beamforming block 220 among others.

Channel quality information feedback 215 may, for purposes of illustration, be in the form of quantized channel measurements, modulation, coding, and/or spatial formatting decisions, received signal strength, and signal-to-interference-plus-noise measurements. A processor 235 may be used to execute applications for BS 201, and may be used to control the operation of units such as codebook adjust unit 206, channel estimate transform unit 230, modulation and coding block 210, scheduler 204, and so forth.

Figure 2B:
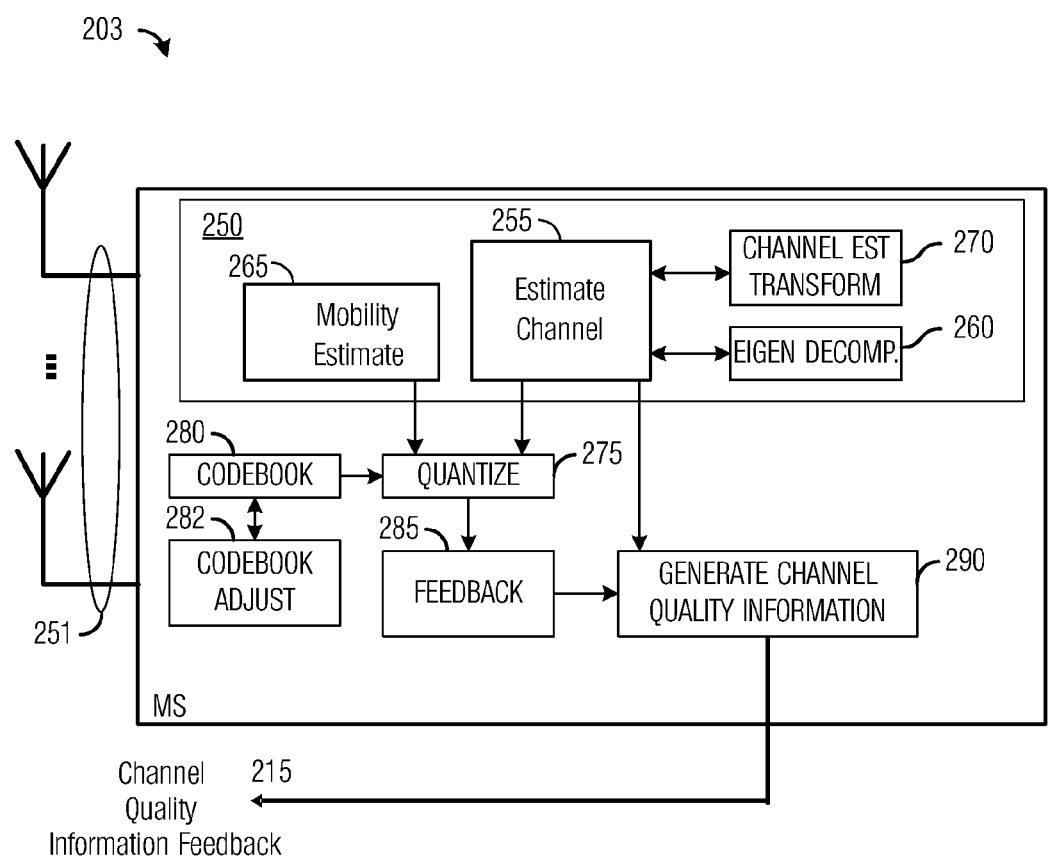
FIG. 2b illustrates an example mobile station according to example embodiments described herein.

FIG. 2b illustrates MS 203. MS 203 may have one or more receive antennas 251, connecting through RF circuitry to a receiver signal processing block 250. Some of the key components of receiver signal processing block 250 include channel estimation block 255, eigen decomposition block 260, and a mobility estimate block 265.

Channel estimation block 255 may employ any number of algorithms known in the art including least squares, maximum likelihood, maximum a postiori, Bayes estimator, adaptive estimator, a blind estimator, or so forth, to estimate a channel between MS 203 and its serving BS. Some algorithms exploit known information inserted into the transmit signal in the form of training signals, training pilots, while others use structure in the transmitted signal such as cyclostationarity to estimate coefficients of the channel between the BS and the MS.

Eigen decomposition block 260 may be used to compute eigen components of a spatial domain channel correlation matrix of a channel between MS 203 and its serving BS. According to an example embodiment, eigen decomposition block 260 may make use of eigen decomposition to compute the eigen components from the spatial domain channel correlation matrix provided by channel estimation block 255, which may then be fedback to the BS serving MS 203. According to an example embodiment, a subset of the total number of eigenvalues are fedback to the BS. For example, if the spatial domain channel correlation matrix decomposes into four eigen components, then two largest eigen components may be fedback. It may be also possible to further reduce the amount of information fedback to the BS by quantizing the eigenvalues using quantization block 275 using codebook 280.

Codebook 280 may be a baseline codebook as specified by a technical standard, provided by an operator of a communications system that includes MS 203, or so forth. Alternatively, codebook 280 may be an adapted codebook that is originally a baseline codebook that has been adapted using long term channel information (in full or partial form) or a function of long term channel information measured by MS 203. Adaptation of codebook 280 may be performed by codebook adjust unit 282. Codebook adjust unit 282 may adapt codebook 280 using channel information, such as long term channel information measured by MS 203. Codebook 280 may be implemented as a memory capable of storing a number of different codebooks, such as different baseline codebooks for different channel models, different adapted codebooks adapted from different baseline codebooks, and so forth.

Codebook 280 may also be a joint codebook, with a first portion used to quantize a first set of channel information and a second portion used to quantize a second set of channel information. As an example, a first portion of a codebook may be used to quantize wideband PMI/CQI and a second portion of the codebook may be used to quantize long term wideband channel statistics.

A channel estimate transform block 270 may be used to transform a model of the channel between the BS and MS 203. For example, channel estimate transform unit 230 may transform the channel estimate into a subspace of the channel, e.g., a long term channel eigenspace or a wideband channel eigenspace, representation of the channel estimate. The transformation of the model of the channel between the BS and MS 203 may allow for a reduction in the amount of channel feedback information by feeding back a different form of channel feedback information that may be amenable to quantization using codebooks as well as reduced dimensionality, which leads to reduced codebook size, thereby increasing codebook resolution while maintaining constant codebook size or reducing codebook size while maintaining codebook resolution. Transforming the model of the channel with quantization may be shown to be equivalent to codebook quantization of an untransformed model of the channel. A detailed discussion of the transformation of the model of the channel is provided below.

As discussed above, channel state information produced from information provided by channel estimation block 255 may be quantized using a quantization block 275. Quantization block 275 quantizes the channel state information using codebook 280. An index from codebook 280 may be output from quantization block 275. An estimate of the amount of channel variation, produced by mobility estimate block 265, may be used to improve the quantization algorithm by initializing the algorithm from a previous quantization level or adjusting the amount of localization.

Feedback block 285 generates a new feedback message by combining the codebook indices output from quantization block 275. Generate channel quality information block 290 generates a special feedback control message employing the outputs of feedback block 285 to produce channel quality information feedback 215. Generate channel quality information block 290 may also apply an error correcting code to protect information in the feedback message from errors.

The above described embodiments of a BS 201 and MS 203 may also be illustrated in terms of methods comprising functional steps and/or non-functional acts. The following (and subsequent) description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the following description of the flow diagrams(s) for FIGS. 3a, 3b, 5a, 5b, 7a, and 7b—is used to indicate the desired specific use (or non-use) of such terms.

Figure 3A:
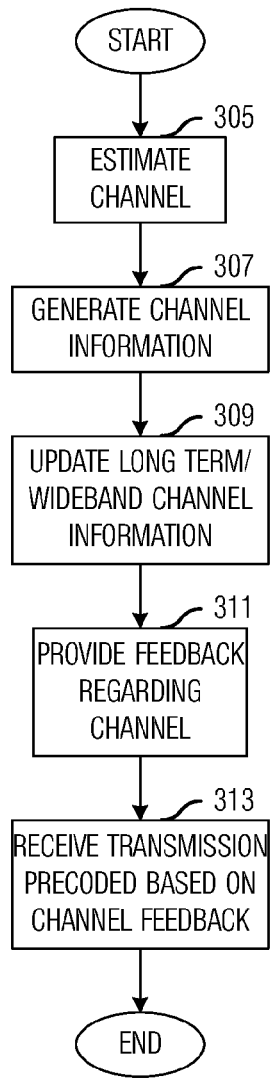
FIG. 3a illustrates an example flow diagram of MS operations in feeding back channel information to a BS according to example embodiments described herein.

FIG. 3a illustrates a flow diagram of MS operations 300 in feeding back channel information to a BS. MS operations 300 may be indicative of operations occurring in a MS, such as MS 203, as the MS feeds back channel information to a BS serving the MS. MS operations 300 may occur while the MS is in a normal operating mode and is being served by the BS.

MS operations 300 may begin with the MS estimating a communications channel between itself and the BS (block 305). The MS may estimate the communications channel by measuring pilot signals transmitted by the BS. In general, the pilot signals may be used by any MS attached to or desiring to attach to the BS. Alternatively, the MS may estimate the communications channel by measuring reference signals transmitted by the BS. The reference signals may be broadcast for use by any MS or the reference signals may be specifically intended for use by only the MS or by MSs that are part of a same group as the MS, for example. The MS may also estimate the communications channel by measuring non-pilot and/or non-reference sequence transmissions made by the BS to the MS over a period of time.

The MS may use the estimate(s) of the communications channel to generate channel information (block 307). Using the estimate(s) of the communications channel, the MS may determine RI, wideband PMI/CQI, subband PMI/CQI, channel state information, short term channel information, long term channel information, frequency domain channel information, time domain channel information, and so on.

The MS may also update long term wideband channel statistics (frequency domain and/or time domain), such as a spatial domain channel correlation matrix R, using the estimate(s) of the communications channel (block 309). The MS may also use the channel information to update the long term wideband channel statistics.

The MS may then provide feedback to the BS information related to the communications channel, which may help the BS achieve improved communications system performance (block 311). As an example, if the information related to the communications channel is in the form of a RI, wideband PMI/CQI, or subband PMI/CQI then the MS may feedback the information over the PUCCH using a RI feedback packet, a wideband PMI/CQI feedback packet, or a subband PMI/CQI feedback packet as specified in the 3GPP LTE technical standards. However, feeding back other forms of information related to the communications channel may require the use of other techniques.

According to an example embodiment, a variety of techniques may be used by the MS to provide information related to the communications channel, such as long term wideband channel statistics, including a spatial domain channel correlation matrix R. A first technique may include combining the long term wideband channel statistics with information that already has its own feedback packet format, such as RI, wideband PMI/CQI, or subband PMI/CQI. A second technique may include a new feedback packet format for the long term wideband channel statistics and then transmitting the new feedback packet to the BS. A detailed discussion of the two techniques is provided below.

In order to reduce communications overhead, the MS may quantize, compress, or otherwise reduce the size of the information related to the communications channel so that more information may be provided to the BS without consuming additional overhead or reducing the overhead while providing the same amount of information.

The MS may then receive a transmission from the MS, wherein the transmission has been precoded in accordance with precoding coefficients determined based in part on or in accordance with information related to the communications channel provided by the MS (block 313).

Figure 3B:
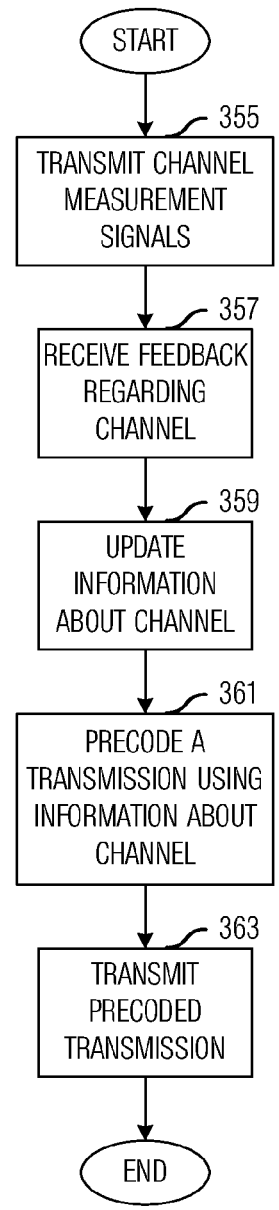
FIG. 3b illustrates an example flow diagram of BS operations in transmitting information to a MS being served by a BS according to example embodiments described herein.

FIG. 3b illustrates a flow diagram of BS operations 350 in transmitting information to a MS being served by a BS. BS operations 350 may be indicative of operations occurring in a BS, such as BS 201, as the BS uses information related to a communications channel between itself and a MS that it is serving to improve communications system performance. BS operations 350 may occur while the BS is in a normal operating mode and is serving at least one MS.

BS operations 350 may begin with the BS transmitting channel measurement signals (block 355). Channel measurement signals may be special signals, such as pilot signals, reference signals, and so forth, transmitted by the BS that may assist the MS in estimating the communications channel between itself and the BS. The channel measurement signals may be for all MSs that receive the signal or may be specifically intended for a single MS or a single group of MSs. Alternatively, the BS may not transmit special signals, but may transmit regular non-pilot signals and/or non-reference signals transmissions and the MSs may estimate the communications channels in accordance with measurements of the regular transmissions made over time.

The BS may receive feedback from the MSs containing information related to the communications channels (block 357). As an example, if the feedback contains information in the form of a RI, wideband PMI/CQI, or subband PMI/CQI then the BS may receive the information over the PUCCH in the form of a RI feedback packet, a wideband PMI/CQI feedback packet, or a subband PMI/CQI feedback packet as specified in the 3GPP LTE technical standards. However, other forms of information may require modification to an existing feedback packet format or a new feedback packet format.

If the information was quantized, compressed, or otherwise reduced in size by the MS to reduce communications overhead, then the BS may need to restore the information.

The BS may use the information to update its information regarding the communications channel (block 359). As an example, the BS may determine RI, wideband PMI/CQI, subband PMI/CQI, channel state information, short term channel information, long term channel information, frequency domain channel information, time domain channel information, and so on, from the information fedback by the MS.

The BS may also update long term wideband channel statistics (frequency domain and/or time domain), such as a spatial domain channel correlation matrix R, using information fedback by the MS. The BS may also make use of channel information, such as RI, wideband PMI/CQI, subband PMI/CQI, channel state information, short term channel information, long term channel information, frequency domain channel information, time domain channel information, and so on, to update the long term wideband channel statistics.

The BS may precode a transmission in accordance with the channel information and/or the long term wideband channel statistics (block 361) and transmit the precoded transmission to the MS (block 363).

According to an example embodiment, a first technique to feedback information to the BS would be to add the information, such as long term wideband channel statistics (e.g., long term and/or wideband channel information (or simply long term/wideband channel information), such as a spatial domain channel correlation matrix R, and so on), to an existing feedback packet. Then, the feedback packet may be transmitted back to the BS.

Figure 4A:
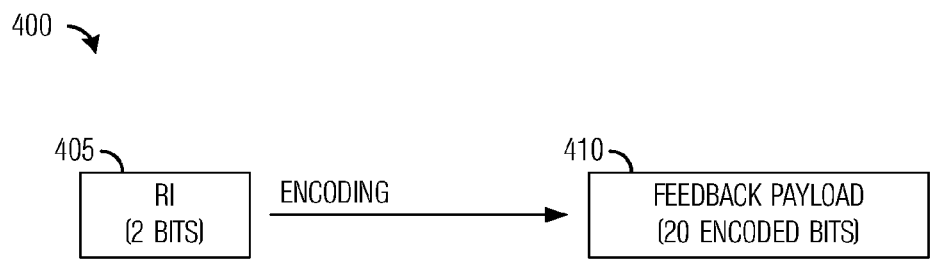
FIG. 4a illustrates an example data portion of a prior art feedback packet format 400 for RI information.

FIG. 4a illustrates a data portion of a prior art feedback packet format 400 for RI information. In an example 3GPP LTE compliant communications system with four transmit antennas, RI feedback (referred to herein as a data payload) requires at least two bits of information out of a maximum of 13 bits in a PUCCH feedback packet. Feedback packet format 400 for RI information includes a two-bit RI data field 405 that may be encoded into a 20-bit feedback payload 410.

Figure 4B:
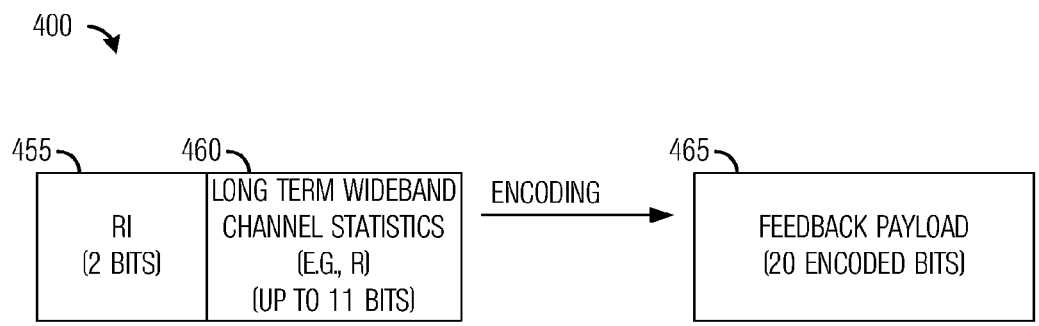
FIG. 4b illustrates an example data portion of a feedback packet format modified to feedback both RI information and long term wideband channel statistics according to example embodiments described herein.

FIG. 4b illustrates a data portion of a feedback packet format 450 modified to feedback both RI information and long term wideband channel statistics. Using the same example conditions as used in FIG. 4b, a RI data field 455 may be two-bits long, leaving up to 11 bits for a long term wideband channel statistics field 460. Furthermore, RI data field 455 may be three-bits long, leaving up to 10 bits for long term wideband channel statistics field 460. RI data field 455 and long term wideband channel statistics field 460, i.e., the data payload, may then be encoded into a 20-bit feedback payload 465. According to an example embodiment, RI data field 455 and long term wideband channel statistics field 460 may be jointly coded (both fields encoded using a single code) or separately coded (each field separately encoded using potentially different codes) to form feedback payload 465.

An advantage of modifying an existing feedback packet format is that a new feedback packet format is not required.

Figure 5A:
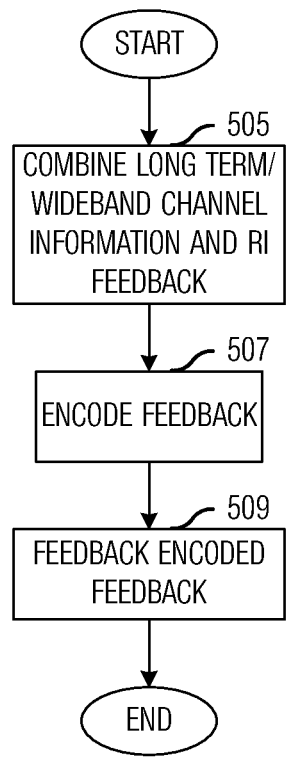
FIG. 5a illustrates an example flow diagram of MS operations in feeding back channel information to a BS according to example embodiments described herein.

FIG. 5a illustrates a flow diagram of MS operations 500 in feeding back channel information to a BS. MS operations 500 may be indicative of operations occurring in a MS, such as MS 203, as the MS feeds back channel information to a BS serving the MS. MS operations 500 may be an implementation of providing feedback regarding channel to BS, block 311 of FIG. 3a. MS operations 500 may occur while the MS is in a normal operating mode and is being served by the BS.

MS operations 500 may combine long term wideband channel statistics with information that already has its own feedback format, such as RI, wideband PMI/CQI, or subband PMI/CQI. The discussion presented below focuses on combining long term wideband channel statistics, e.g., long term/wideband channel information, such as a spatial domain channel correlation matrix R, with RI. However, the example embodiments presented herein may also be operable with channel information, such as wideband PMI/CQI or subband PMI/CQI, for example. Therefore, the discussion of combining the long term wideband channel statistics with RI should not be construed as being limiting to either the scope or the spirit of the example embodiments.

MS operations 500 may begin with the MS combining the RI information with the long term/wideband channel information to produce a data payload (block 505). According to an example embodiment, combining the RI information with the long term/wideband channel information may involve appending the RI information (e.g., two-bits) with up to 11-bits of the long term/wideband channel information. The RI information may be placed before or after the long term/wideband channel information. The RI information may also be placed in between the bits of the long term/wideband channel information, e.g., the RI information is interleaved with the long term/wideband channel information.

If desired, the MS may quantize, compress, or otherwise reduce the size of the RI and/or the long term/wideband channel information to reduce communications overhead.

The combined RI information and the long term/wideband channel information may then be encoded to protect from transmission errors, producing a feedback payload (block 507). For example, an error detecting and correcting code may be used to protect the combined RI information and the long term/wideband channel information. The combined RI information and the long term/wideband channel information may be jointly encoded.

According to an example embodiment, the RI information and the long term/wideband channel information may be separately encoded prior to producing a feedback payload. The RI information and the long term/wideband channel information may be encoded using different codes or the same code.

The feedback payload may then be placed in a feedback packet and fedback (transmitted) to the BS (block 509). According to an embodiment, the feedback packet may be transmitted at a network resource normally used to transmit a feedback packet comprising the RI information, i.e., a network resource for feeding back RI information.

Figure 5B:
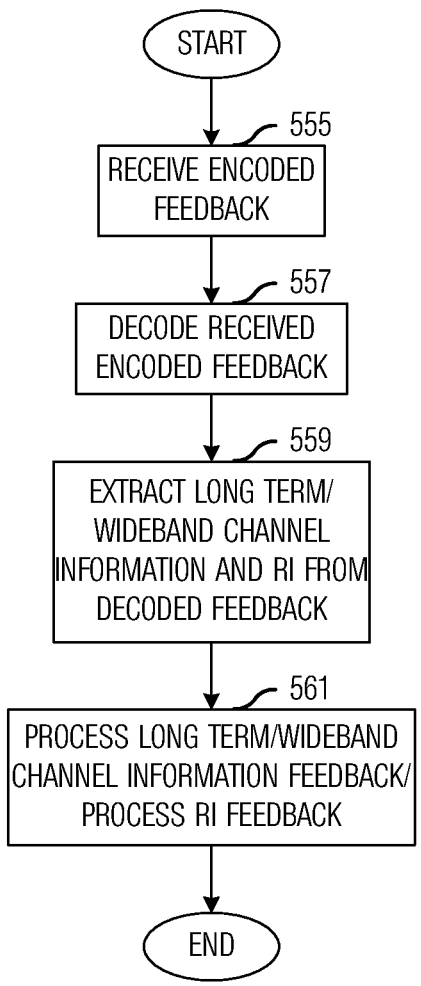
FIG. 5b illustrates an example flow diagram of BS operations in processing feedback information from a MS being served by a BS according to example embodiments described herein.

FIG. 5b illustrates a flow diagram of BS operations 550 in processing feedback information from a MS being served by a BS. BS operations 550 may be indicative of operations occurring in a BS, such as BS 201, as the BS processes information related to a communications channel between itself and a MS that it is serving to improve communications system performance. BS operations 550 may occur while the BS is in a normal operating mode and is serving at least one MS.

BS operations 550 may involve the use of an existing feedback packet format to feedback long term wideband channel statistics, such as a long term/wideband channel information. The existing feedback packet format may correspond to feedback packet formats used to feedback RI, wideband PMI/CQI, or subband PMI/CQI. The discussion presented below focuses on the use of a feedback packet format for RI to feedback the long term/wideband channel information. However, the example embodiments presented herein may also be operable with channel information, such as wideband PMI/CQI or subband PMI/CQI, for example. Therefore, the discussion of combining the long term wideband channel statistics with RI should not be construed as being limiting to either the scope or the spirit of the example embodiments.

BS operations 550 may begin with the BS receiving encoded feedback in the form of a feedback packet (block 555). According to an example embodiment, the feedback packet comprises a feedback payload with encoded versions of RI and a long term/wideband channel information. The encoded versions of RI and the long term/wideband channel information may be jointly or separately encoded.

The BS may decode the encoded versions of RI and the long term/wideband channel information to produce a data payload (block 557). According to an example embodiment, if the encoded versions of RI and the long term/wideband channel information are jointly encoded, then the BS may decode both in a single decoding operation, while if the encoded versions of RI and the long term/wideband channel information are separately encoded, then the BS may decode the encoded versions of RI and the long term/wideband channel information separately.

The BS may extract the RI and the spatial domain channel correlation matrix from the data payload (block 559). If the MS quantized, compressed, or otherwise reduced the size of the RI and/or the long term/wideband channel information, the BS may reverse the quantization, compression, or other size reduction technique. The BS may process the RI feedback and/or the long term/wideband channel information feedback (block 561).

According to an example embodiment, a second technique to feedback information to the BS would be to use a separate feedback packet format for the long term wideband channel statistics, e.g., the long term/wideband channel information. The utilization of a separate feedback packet format for the long term wideband channel statistics instead of modifying an existing feedback packet format has an advantage of not impacting an existing feedback packet format.

As an example, the feedback of the long term wideband channel statistics, e.g., the long term/wideband channel information, may be performed in a manner similar to the feedback of the RI (although the feedback of other information related to the communications channel, such as wideband PMI/CQI or subband PMI/CQI may also be used). Encoding of the spatial domain channel correlation matrix may be similar to the encoding of the RI.

Figure 6:
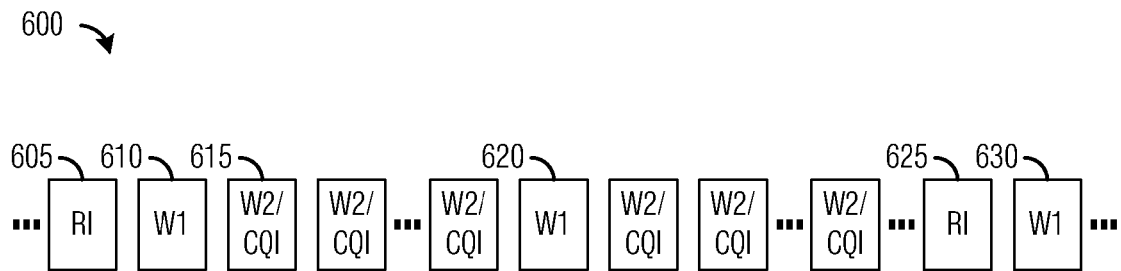
FIG. 6 illustrates an example sequence of feedback packets according to example embodiments described herein.
Figure 6:

FIG. 6 illustrates a sequence of feedback packets 600. Sequence of feedback packets 600 illustrates feedback packets transmitted on a PUCCH by a MS to a BS serving the MS. Sequence of feedback packets 600 illustrates only some of the feedback packets transmitted on the PUCCH, other feedback packets may be omitted to maintain simplicity of FIG. 6.

Sequence of feedback packets 600 includes a first feedback packet 605 that may be used to feedback RI information to the BS, while a second feedback packet 610 may be used to feedback the long term/wideband channel information to the BS. Second feedback packet 610 is shown labeled "W1" to simplify notation in FIG. 6. A third packet 615 may be used to feedback both wideband PMI (labeled "W2") and wideband CQI.

According to an example embodiment, the feedback of the RI information may be fedback to the BS with period $T_{RI}$ and the feedback of the long term/wideband channel information with period $T_R$.

One way to place a constraint on the feedback of the long term/wideband channel information is to set $T_R$ so that $T_R$ is a multiple of $T_{RI}$, expressible as $$T_R = N*T_{RI},$$

where N is an integer value.

Another way to place a constraint on the feedback of the long term/wideband channel information is to set $T_{RI}$ so that $T_{RI}$ is a multiple of $T_R$, expressible as $$T_{RI} = M*T_R,$$

where M is an integer value.

Sequence of feedback packets 600 includes a fourth feedback packet 620 that may be used to feedback the long term/wideband channel information to the BS, a fifth feedback packet 625 that may be used to feedback RI to the BS, and a sixth feedback packet 630 that may be used to feedback the long term/wideband channel information to the BS.

As shown in FIG. 6, the period of the feedback of the RI ($T_{RI}$) is greater than the period of the feedback of the long term/wideband channel information ($T_R$), however, $T_{RI}$ may be less than or equal to $T_R$.

Figure 7A:
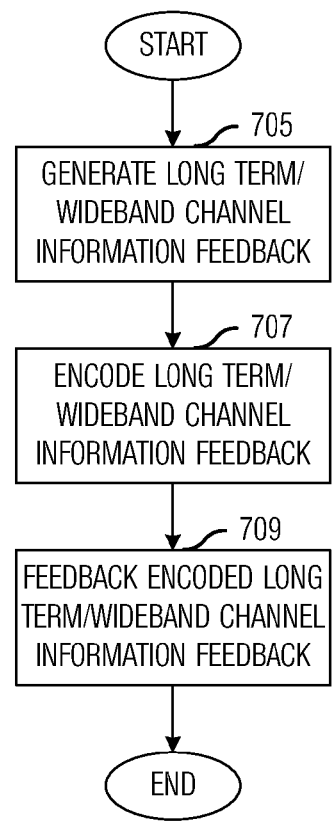
FIG. 7a illustrates an example flow diagram of MS operations in feeding back long term wideband channel statistics, e.g., a spatial domain channel correlation matrix R, to a BS according to example embodiments described herein.

FIG. 7a illustrates a flow diagram of MS operations 700 in feeding back long term wideband channel statistics, e.g., a long term/wideband channel information, such as a spatial domain channel correlation matrix R, to a BS. MS operations 700 may be indicative of operations occurring in a MS, such as MS 203, as the MS feeds back channel information to a BS serving the MS. MS operations 700 may be an implementation of providing feedback regarding channel to BS, block 311 of FIG. 3a. MS operations 700 may occur while the MS is in a normal operating mode and is being served by the BS.

MS operations 700 may begin with the MS generating the long term/wideband channel information to form a data payload (block 705). According to an example embodiment, the data payload may include up to 13 bits of information related to the long term/wideband channel information. The MS may encode the data payload to protect from transmission errors (block 707).

The encoded data payload may be placed in a feedback packet and then fedback (transmitted) to the BS (block 709). The feedback of the feedback packet may depend on the period of the feedback packet. According to an example embodiment, the feedback of a feedback packet for feeding back the long term/wideband channel information on the PUCCH may result in a displacement of existing feedback packets which may be feeding back RI, wideband PMI/CQI, or subband PMI/CQI, for example. The displacement of an existing feedback packet by a new feedback packet may be analogous to puncturing the existing feedback packet with the new feedback packet.

According to an example embodiment, the feedback of the feedback packet containing the spatial domain channel correlation matrix R may replace (puncture) a feedback packet containing RI. A RI feedback packet may be replaced by a long term/wideband channel information feedback packet. The lost RI feedback may be replaced by a previously received RI feedback.

According to an example embodiment, the feedback of the feedback packet containing the long term/wideband channel information may replace (puncture) a feedback packet containing wideband PMI/CQI. Since wideband PMI/CQI feedback is short term information and typically occurs at a higher frequency than RI feedback or long term/wideband channel information feedback, a lost wideband PMI/CQI feedback may be more tolerable than the lost RI feedback.

According to an example embodiment, the lost wideband PMI/CQI feedback may be replaced with a previously received wideband PMI/CQI feedback, such as a most recently received wideband PMI/CQI feedback. Alternatively, a previously received wideband PMI/CQI feedback but not necessarily the most recently received wideband PMI/CQI feedback may be used to replace the lost wideband PMI/CQI feedback. Alternatively, an average of previously received wideband PMI/CQI feedbacks may be used.

According to an example embodiment, the lost wideband PMI/CQI feedback may be replaced with eigenvectors of the spatial domain channel correlation matrix R that punctured the wideband PMI/CQI feedback.

According to an example embodiment, the lost wideband PMI/CQI feedback may be replaced with a combination of a previously received wideband PMI/CQI feedback and eigenvectors of the spatial domain channel correlation matrix R that punctured the wideband PMI/CQI feedback.

According to an example embodiment, if the long term/wideband channel information, i.e., W1, is used to adapt wideband PMI/CQI information, it may be preferred that at least one period of wideband PMI/CQI feedback be skipped prior to beginning adaptation with the long term/wideband channel information. The additional time may allow sufficient time for processing at the BS and the MS.

According to an embodiment, the feedback of the feedback packet containing the long term/wideband channel information may replace (puncture) a feedback packet containing subband PMI/CQI. In general, subband PMI/CQI may be considered to be the least important of RI, wideband PMI/CQI, or subband PMI/CQI, so loss of a single subband PMI/CQI feedback may not result in poor performance. The lost subband PMI/CQI may be replaced with a previously received CQI feedback, for example.

According to an example embodiment, since the feedback of the feedback packet containing the long term/wideband channel information occurs periodically, it may be possible that the feedback of the feedback packet occurs at a network resource normally used to feedback channel information that should not be punctured (in accordance with some specified puncturing criteria, such as importance of the information being fedback). When this situation arises, the feedback of the feedback packet containing the long term/wideband channel information may be delayed by a specified amount, or skipped.

Figure 7B:
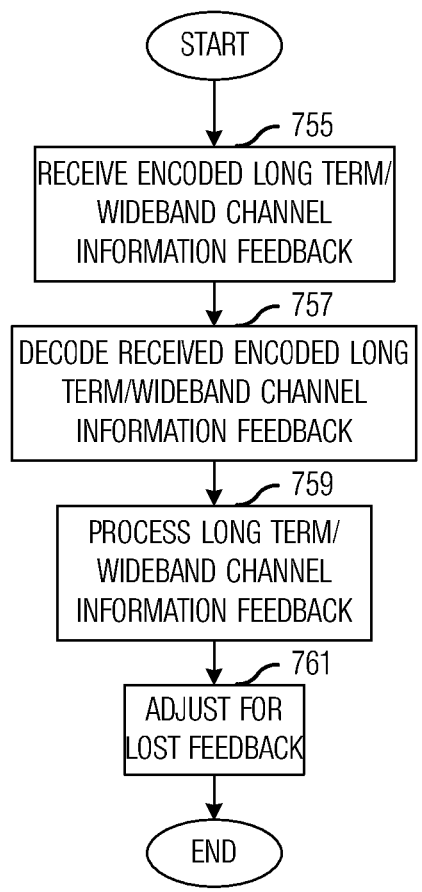
FIG. 7b illustrates an example flow diagram of BS operations in processing long term wideband channel statistics, e.g., a spatial domain channel correlation matrix R, received from a MS served by the BS according to example embodiments described herein.

FIG. 7b illustrates a flow diagram of BS operations 750 in processing long term wideband channel statistics, e.g., long term/wideband channel information, such as a spatial domain channel correlation matrix R, received from a MS served by the BS. BS operations 750 may be BS operations 750 may be indicative of operations occurring in a BS, such as BS 201, as the BS processes information related to a communications channel between itself and a MS that it is serving to improve communications system performance. BS operations 750 may occur while the BS is in a normal operating mode and is serving at least one MS.

BS operations 750 may begin with the BS receiving a feedback packet comprising an encoded version of the long term/wideband channel information as a feedback payload from the MS (block 755). The BS may decode the feedback payload to obtain a data payload, i.e., the spatial domain channel correlation matrix R (block 757). The BS may process the long term/wideband channel information (block 759).

Since the feedback packet containing the long term/wideband channel information punctured another feedback packet, the BS may need to perform an adjustment for lost feedback information (block 761). According to an example embodiment, the adjustment for lost feedback information may depend upon the feedback lost. As an example, if RI information is lost, then a previously received RI may replace the lost RI information. While, if wideband PMI/CQI information is lost, then a previously received wideband PMI/CQI or eigenvectors of the spatial domain channel correlation matrix R may replace the lost wideband PMI/CQI information. Similarly, if subband PMI/CQI information is lost, then a previously received subband PMI/CQI may replace the lost subband PMI/CQI information.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operations, the method comprising:
generating feedback information, wherein the feedback information comprises at least wideband channel statistics ("WCS") and long term wideband channel statistics ("LTWCS"), wherein the LTWCS comprise rank indicator (RI) information, wherein the WCS comprise a precoding matrix indicator (PMI), wherein the RI and the PMI are jointly encoded, and wherein the PMI is a part of a codebook used to quantize the LTWCS;
encoding the feedback information to produce a feedback payload; and
transmitting the feedback payload to a communications server serving a communications device.

2. The method of claim 1, wherein the LTWCS comprise any one, or combination, of the following: time domain channel statistics, frequency domain channel statistics, and spatial domain channel statistics.

3. The method of claim 1, wherein the LTWCS comprise a spatial domain channel correlation matrix.

4. The method of claim 1, wherein the PMI represents a spatial domain channel correlation matrix.

5. The method of claim 1, wherein the feedback information further comprises channel information.

6. The method of claim 5, wherein the channel information comprises a wideband PMI, a wideband channel quality index, a subband channel quality index, or combinations thereof.

7. The method of claim 5, wherein transmitting the feedback payload comprises transmitting the feedback payload at a network resource for transmitting a feedback payload comprising the channel information.

8. The method of claim 1, wherein the generating, the encoding, and the transmitting occurs periodically.

9. The method of claim 8, wherein the transmitting occurs at a network resource used for transmitting an alternate feedback payload that is not to be punctured, and wherein the transmitting further comprises delaying the transmitting by a specified amount of network resources.

10. The method of claim 1, wherein the codebook comprises the PMI and another PMI.

11. A method for communications controller operations, the method comprising:
receiving a feedback payload from a communications device;
decoding the feedback payload with a feedback decoder to produce feedback information, wherein the feedback information comprises at least wideband channel statistics ("WCS") and long term wideband channel statistics ("LTWCS"), wherein the LTWCS comprise rank indicator (RI) information, wherein the WCS comprise a precoding matrix indicator (PMI), wherein the RI and the PMI are jointly decoded, and wherein the PMI is a part of a codebook used to quantize the LTWCS; and
precoding a transmission in accordance with the LTWCS and the WCS.

12. The method of claim 11, wherein the feedback payload further comprises channel information.

13. The method of claim 12, wherein the channel information comprises any one, or a combination, of the following: a wideband precoding matrix indicator, a wideband channel quality index, and a subband channel quality index.

14. The method of claim 11, wherein receiving the feedback payload comprises receiving the feedback payload at a network resource for receiving a channel information feedback payload comprising channel information.

15. The method of claim 14, wherein the feedback payload punctured the channel information feedback payload.

16. The method of claim 14, wherein the channel information is maintained at a communications controller, and the method further comprising adjusting the channel information of the channel information feedback payload punctured by the feedback payload.

17. A communications device comprising:
- a channel estimate unit configured to be coupled to a receiver, and to estimate a communications channel between the communications device and a communications controller serving the communications device;
- a feedback information generator coupled to the channel estimate unit, the feedback information generator configured to generate feedback information in accordance with the estimate of the communications channel and to encode the feedback information to produce a feedback payload, wherein the feedback information comprises at least wideband channel statistics ("WCS") and long term wideband channel statistics ("LTWCS"), wherein the LTWCS comprise rank indicator (RI) information, wherein the WCS comprise a precoding matrix indicator (PMI), wherein the RI and the PMI are jointly encoded, and wherein the PMI is a part of a codebook used to quantize the LTWCS; and
- a transmitter coupled to the feedback information generator, the transmitter configured to transmit the feedback payload to the communications controller.

18. The method of claim 11, wherein the codebook comprises the PMI and another PMI.

19. The communication device of claim 17, wherein the codebook comprises the PMI and another PMI.

* * * * *